(12) United States Patent
Jeon

(10) Patent No.: US 12,536,699 B2
(45) Date of Patent: Jan. 27, 2026

(54) PRECISE POSITIONING METHOD, APPARATUS AND SYSTEM USING MULTI-SOURCE DATA MATCHING MAP IMAGE

(71) Applicant: Electronics and Telecommunications Research Institute, Daejeon (KR)

(72) Inventor: Ju Il Jeon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 207 days.

(21) Appl. No.: 18/468,440

(22) Filed: Sep. 15, 2023

(65) Prior Publication Data
US 2024/0312054 A1    Sep. 19, 2024

(30) Foreign Application Priority Data
Mar. 13, 2023 (KR) .......................... 10-2023-0032491

(51) Int. Cl.
*G01S 19/45* (2010.01)
*G06T 7/73* (2017.01)
(Continued)

(52) U.S. Cl.
CPC ................ *G06T 7/74* (2017.01); *G01S 19/45* (2013.01); *G06T 11/001* (2013.01); *H04W 4/02* (2013.01);
(Continued)

(58) Field of Classification Search
CPC ...................... G06T 7/74; G06T 11/001; G06T 2207/20081; G06T 2210/32; G06T 11/00;
(Continued)

(56) References Cited

U.S. PATENT DOCUMENTS 9,473,903 B1 * 10/2016 Gu ........................ H04W 72/51
2006/0133398 A1    6/2006 Choi et al.
(Continued)

FOREIGN PATENT DOCUMENTS

KR   10-2015-0135714    12/2015
KR   10-2019-0053470    5/2019
(Continued)

OTHER PUBLICATIONS

Liu et al. (NPL), (2019), "Hybrid Wireless Fingerprint Indoor Localization Method Based on a Convolutional Neural Network". (Year: 2019).*

(Continued)

*Primary Examiner* — Daniel F Hajnik
*Assistant Examiner* — Adeel Bash
(74) *Attorney, Agent, or Firm* — KILE PARK REED & HOUTTEMAN PLLC

(57) ABSTRACT

Disclosed are a positioning method including: obtaining, by a device for providing a positioning function, multi-source wireless signal data from a collection data database (DB); generating, by the device, a matching map using the multi-source wireless signal data; generating, by the device, a matching map image corresponding to the matching map; generating, by the device, a classification model for positioning that outputs a labeling value of the matching map image when the matching map image is input; and performing, by the device, positioning based on a labeling value of a classified image that is output as a result of inputting the matching map image to the classification model for positioning, and a positioning device for providing a positioning function.

16 Claims, 7 Drawing Sheets

(51) Int. Cl.
  *G06T 11/00*   (2006.01)
  *H04W 4/02*   (2018.01)
(52) U.S. Cl.
  CPC .............. *G06T 2207/20081* (2013.01); *G06T 2210/32* (2013.01)
(58) Field of Classification Search
  CPC ..... G06T 7/30; G06T 7/70; G06T 7/90; G01S 19/45; G01S 19/48; G01S 5/02521; G01S 5/02; H04W 4/02; G01C 21/3833; G01C 21/387; G06N 3/08
  See application file for complete search history.

(56) References Cited

U.S. PATENT DOCUMENTS

| | | | |
|---|---|---|---|
| 2008/0130600 A1 | 6/2008 | Jun et al. | |
| 2021/0092611 A1* | 3/2021 | Pasricha | H04W 4/33 |
| 2022/0374458 A1 | 11/2022 | Cho et al. | |

FOREIGN PATENT DOCUMENTS

| | | |
|---|---|---|
| KR | 10-2022-0003313 | 1/2022 |
| KR | 10-2022-0150604 | 11/2022 |

OTHER PUBLICATIONS

Shao et al. (NPL), (2018), "Indoor Positioning Based on Fingerprint-Image and Deep Learning". (Year: 2018).*
Kawecki et al. (NPL), (2022), "Performance of Fingerprinting-Based Indoor Positioning with Measured and Simulated RSSI Reference Maps". (Year: 2022).*
Brida et al. (NPL), (2014), "A Modular Localization System as a Positioning Service for Road Transport" (Year: 2014).*
Jang et al. (NPL), (2018), "Indoor Localization with WiFi Fingerprinting Using Convolutional Neural Network". (Year: 2018).*

* cited by examiner (a) TRAINING DATA   (b) BASE DATA GRID   (c) MATCHING MAP (a) MATCHING MAP IMAGE
FOR POSITIONING (b) IMAGE CLASSIFICATION
MODEL FOR POSITIONING (c) POSITIONING RESULT
(GRID COORDINATES)

PRECISE POSITIONING METHOD, APPARATUS AND SYSTEM USING MULTI-SOURCE DATA MATCHING MAP IMAGE

CROSS-REFERENCE TO RELATED APPLICATION

This application claims priority to and the benefit of Korean Patent Application No. 10-2023-0032491, filed in the Korean Intellectual Property Office on Mar. 13, 2023, the entire contents of which are incorporated herein by reference.

BACKGROUND

1. Field of the Invention

The present invention relates to a precise positioning method using a multi-source data matching map image among wireless communication signal-based location recognition technologies.

2. Discussion of Related Art

Location estimation technology using wireless communication infrastructure is being variously researched according to the type of infrastructure and service method. For example, a global navigation satellite system (GNSS) uses a technology for estimating a location of a user using satellite signals from the Earth's orbit.

On the other hand, while the location estimation technology provides high accuracy and availability in wide open areas, such as expansive development sites, within 10 meters, in city areas, position errors increase, and especially in indoor areas, the reception sensitivity is lowered, and the signals are not received, making it difficult to determine a location in many cases.

Cellular-based location estimation technology among wireless communication infrastructure based-location estimation technologies is a technology for estimating a user's location using the location of a mobile communication base station or a relay and the signal strength. However, since it is required to identify location information of the base station and the relay, the technology has been developed with a focus on telecommunication companies, and since base stations and relays cover wide ranges, positioning accuracy is relatively low.

For indoors, Wi-Fi based location estimation technology has been developed. The technology is a method in which a location-specific received signal strength is collected for each Wi-Fi access point (AP) present in a service area, a database is constructed with the received signal strength values, and the most similar pattern to a signal strength pattern received at a current location of a user's terminal in the database is estimated as the current location. The Wi-Fi based location estimating technology has relatively high accuracy, and thus is applicable even to indoor navigation services, but there is a limitation in constructing it in all buildings because it takes much time and money to collect Wi-Fi signals.

For indoors, Bluetooth-beacon based positioning methods are also widely used. Compared to other wireless communication infrastructures, the signal strength is low and the transmission distance of the signal is short, but by using these characteristics, precise positioning can be performed in areas in which Bluetooth beacons are installed. However, to this end, there is a need to install a separate Bluetooth beacon and supply power. However, recently, Bluetooth communication modules have been attached to various home appliances, and smartphones, which are used by users, basically support Bluetooth communication, and thus the range of application has tended to increase compared to the past.

As described above, there are various positioning methods according to the surrounding environment, but there are advantages and disadvantages with different types of wireless signal data, and it is difficult to perform stable positioning due to the influence of the surrounding environment.

SUMMARY OF THE INVENTION

The present invention is directed to disclosing a precision positioning method in which a matching map image capable of reflecting various types of multi-source wireless signal data and spatial characteristics of a region in which the data is collected is generated and deep learning is applied to the matching map image.

The technical objectives of the present invention are not limited to the above, and other objectives may become apparent to those of ordinary skill in the art based on the following descriptions.

According to an embodiment of the present invention, there is disclosed a positioning method including: obtaining, by a device for providing a positioning function, multi-source wireless signal data from a collection data database (DB); generating, by the device, a matching map using the multi-source wireless signal data; generating, by the device, a matching map image corresponding to the matching map; generating, by the device, a classification model for positioning that outputs a labeling value of the matching map image when the matching map image is input; and performing, by the device, positioning based on a labeling value of a classified image that is output as a result of inputting the matching map image to the classification model for positioning, and a positioning device for providing a positioning function.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
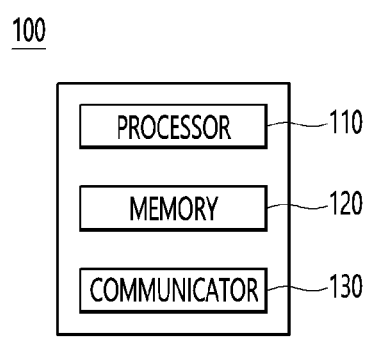
FIG. 1 illustrates a computing device (100) according to an embodiment of the present invention.

In the following detailed description, the technology to be described below may have various changes and various embodiments, specific embodiments will be illustrated in the accompanying drawings and described in detail. However, this is not intended to limit the technology described below to specific embodiments, and it should be understood to include all modifications, equivalents, or substitutes included in the spirit and scope of the technology described below.

Terms such as first, second, A, B, etc. may be used to describe various elements, but the elements are not limited by the above terms, and are merely used to distinguish one element from another. For example, without departing from the scope of the technology described below, a first element may be referred to as a second element, and similarly, the second element may be referred to as the first element. Term "and/or" includes any combination of a plurality of related recited items or any of a plurality of related recited items.

In terms used in this specification, singular expressions should be understood to include plural expressions unless clearly interpreted differently in the context, and terms such as "comprising" refer to the described features, numbers, steps, operations, and components, parts or combinations thereof, but it should be understood that it does not exclude the possibility of the presence or addition of one or more other features, numbers, steps, operations, and components, parts or combinations thereof.

Prior to a detailed description of the drawings, it is to be clarified that the classification of components in the present specification is merely a classification for each component responsible for each main function. That is, two or more components to be described below may be combined into one component, or one component may be divided into two or more for each subdivided function. In addition, each component to be described below may additionally perform some or all of the functions of other components in addition to its main function, and some of the main functions of each component may be performed by other components. Of course, some of the main functions of each component may be exclusively performed by other components.

In addition, in performing a method or method of operation, each process constituting the method may occur in a different order from the specified order unless a specific order is clearly described in the context. That is, each process may occur in the same order as specified, may be performed substantially simultaneously, or may be performed in the reverse order.

In the following description, operations according to an embodiment of the present invention are illustrated as being performed by a computing device 100. The computing device 100 is a device that consistently processes input data and performs required computation according to a specific model or algorithm. For example, the computing device may be implemented in the form of a personal computer (PC), a server on a network, a smart device, a chipset in which a design program is embedded, and the like.

FIG. 1 illustrates a computing device 100 according to an embodiment of the present invention.

In FIG. 1, a block configuration diagram of a computing device related to an embodiment of the present disclosure is illustrated. Components of the computing device 100 shown in FIG. 1 are provided for illustrative purposes. Only some of the components shown in FIG. 1 may constitute the computing device 100, and additional component(s) other than the components shown in FIG. 1 may be included in the computing device 100.

Referring to FIG. 1, the computing device 100 may include a processor 110, a memory 120, and a communicator 130.

The communicator 130 may transmit and receive data to and from external devices, such as other electronic devices or servers, using wired/wireless communication technology. For example, the communicator 130 may transmit and receive sensor information, user input, a learning model, a control signal, and the like to and from external devices.

The memory 120 may store data supporting various functions of the computing device 100.

The processor 110 may determine at least one executable operation of the computing device 100. In addition, the processor 110 may control components of the computing device 100 to perform the determined operation.

To this end, the processor 110 may request, retrieve, receive, or utilize data of the memory 120, and control components of the computing device 100 to execute a predicted operation or an operation identified as being desirable among the at least one executable operation.

In this case, when there is a need to link with an external device to perform the determined operation, the processor 110 may generate a control signal for controlling the external device, and transmit the generated control signal to the external device.

The processor 110 may control at least some components or a combination of components of the computing device 100 to drive an application program stored in the memory 120.

The computing device 100 according to the embodiment of the present invention may transmit data and receive data through an interconnection through wireless and/or wired communication. The computing device according to the present disclosure may include any type of computing device capable of computing data in electronic form.

For example, the computing device may be implemented as a fixed device or a movable device, such as a television (TV), a projector, a mobile phone, a smart phone, a desktop computer, a notebook, a digital broadcasting terminal, a personal digital assistant (PDA), a portable multimedia player (PMP), a navigation system, a tablet PC, a wearable device, a set-top boxes (STB), a Digital Multimedia Broadcasting (DMB) receiver, a radio, a washing machine, a refrigerator, a desktop computer, digital signage, a robot, a vehicle, or the like.

Meanwhile, terms according to an embodiment of the present invention are defined as follows.

A terminal (not shown) for positioning is a terminal targeted for positioning.

A terminal 200 for providing a positioning function may be a computing device 100 or a positioning system server that performs precise positioning using a multi-source data matching map image in response to a positioning request signal from the terminal for positioning.

The multi-source data may include a plurality of different types of communication data, and may include Long-Term Evolution (LTE), wireless fidelity (Wi-Fi), 5G, and Bluetooth Low Energy (BLE) signals.

Meanwhile, according to embodiments, a terminal for positioning and a terminal for providing a positioning function may be present separately from each other, or may be provided in one device.

A classification model for positioning is an artificial neural network model generated based on an image classification model, and is a model trained to receive a matching map image as an input and output grid coordinates, that is, labeling values, of the matching map image.

Hereinafter, a block diagram of a precision positioning terminal using a multi-source data matching map image is illustrated with reference to FIG. 2.

Figure 2:
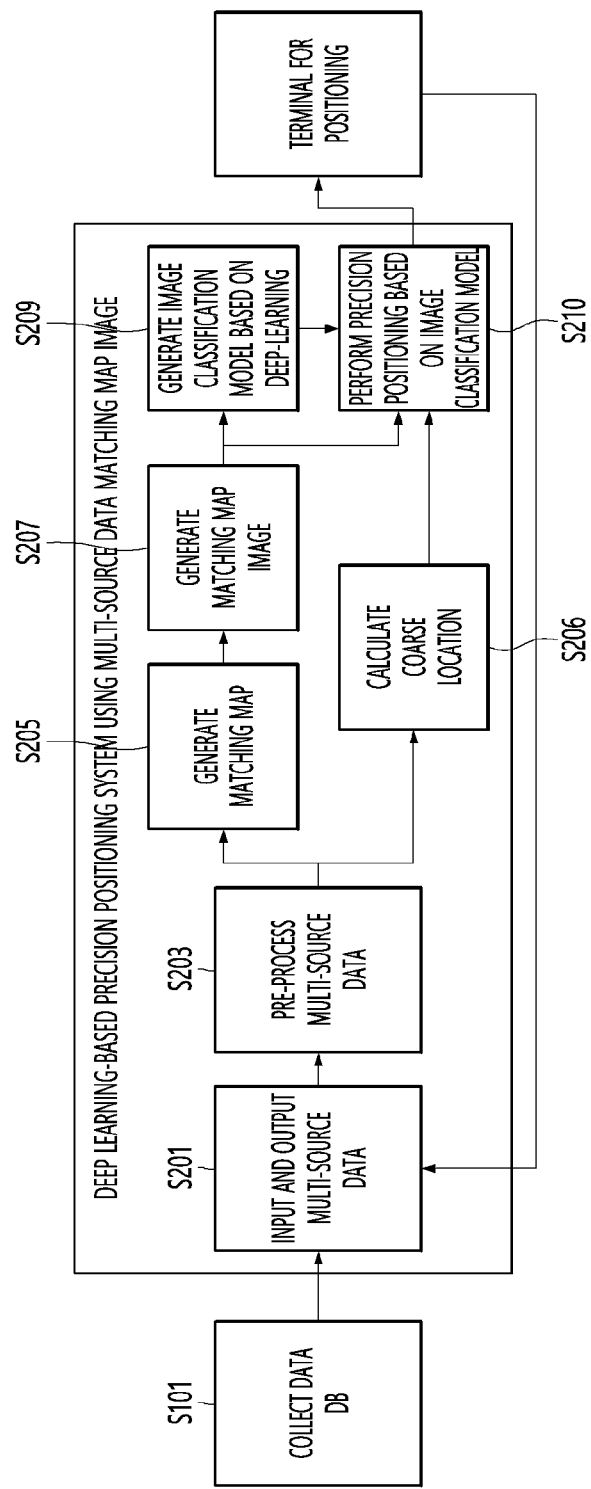
FIG. 2 illustrates a configuration of a positioning device (200) according to an embodiment of the present invention.

FIG. 2 illustrates a configuration of the terminal 200 according to an embodiment of the present invention.

Referring to FIG. 2, the terminal 200 according to the embodiment of the present invention may include all of the components of FIG. 1.

In FIG. 2, a block diagram illustrating the operation of a terminal 200 for providing a deep learning-based precise positioning function using a multi-source data matching map image is shown. The components may be operated under the control of the processor 110 shown in FIG. 1.

Referring to FIG. 2, the terminal 200 for providing a positioning function in response to a request of the terminal for positioning may obtain multi-source wireless signal data from a collection data database (DB) (S201). The obtained multi-source wireless signal data may be pre-processed (S203), and the terminal 200 may use the pre-processed multi-source wireless signal data to generate a matching map and a matching map image corresponding to the matching map (S205 and S207).

Thereafter, the terminal 200 may generate a classification model for positioning through image classification model-based deep learning (S209).

The terminal 200 for providing the positioning function may perform positioning based on a labeling value of a classified image resulting from a matching map image being input to the classification model for positioning generated as above (S210).

The following description will be made in relation to a method of generating a collection data DB based on multi-source wireless signal data (S101).

Multi-source wireless signal data used for precise positioning according to the present invention may include at least one of LTE data, Wi-Fi data, and BLE data.

Specifically, the multi-source wireless signal data may include Global Positioning System (GPS) location information, a collection time, and key information (a physical cell identifier (PCI), a BAND, Media Access Control (MAC), reference signal received power (RSRP), a received signal strength indicator (RSSI), etc.) of each piece of wireless signal data.

According to an embodiment of the present invention, the multi-source wireless signal data may be collected using a collecting device (not shown), and the collecting device may be mounted on a vehicle, a motorized mobile device, or a device capable of movement such as walking.

According to an embodiment of the present invention, the multi-source wireless signal data collected by the collection device may be stored in the collection data DB, and the database DB may include a specific point of which multi-source wireless signals are stored.

In the collection data DB, base data obtained by pre-processing all data of specific points collected over a certain period of time in the same range and training data obtained by collecting data of the specific points with a single epoch in the same range and separately pre-processing the data a set number of times may be stored.

Hereinafter, a process of generating a matching map using input and output and preprocessing of multi-source data will be described (S201 to S207).

Figure 3:
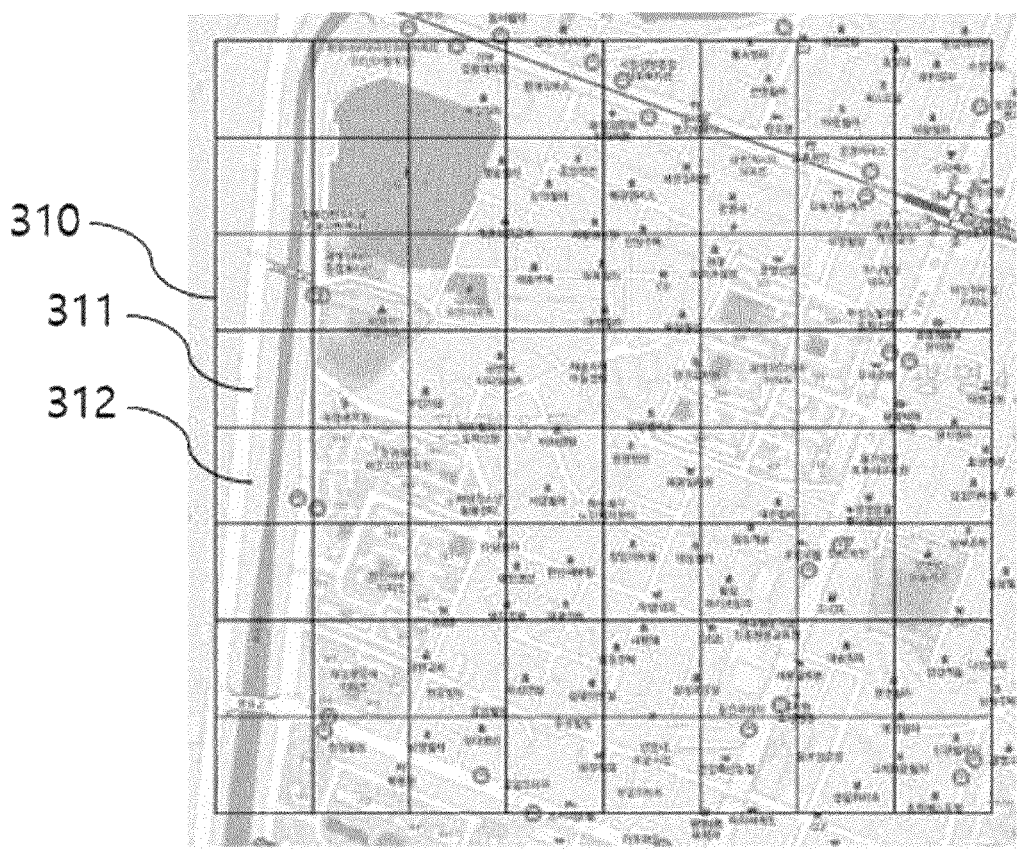
FIG. 3 illustrates an example of a base data grid for generating a matching map image.

FIG. 3 illustrates an example of a base data grid 310 for generating a matching map image.

The terminal 200 for providing a positioning function according to an embodiment of the present invention may generate the grid 310 by combining a number of points arbitrarily designated by a user in a collection data DB to generate a matching map.

The terminal 200 may generate a grid that divides a positioning target area into predetermined regions in the positioning target area, and perform pre-processing on multi-source data of each point (e.g., points 311 and 312) of the grid 310 to synchronize the data with the same time zone, and refine key data required for generating a matching map (S201 and S203).

The terminal 200 may generate a matching map using the refined data (S205).

The matching map may be derived by inputting training data to each point (e.g., 311 and 312) of a base data grid 310, and calculating the number of pieces of matching data between the training data and base data (key information of corresponding wireless signal data) of each point, and may refer to a grid having a matching count for each point.

In this case, the number of pieces of matching data is the number of cases in which key information of the training data coincides with key information of the wireless signal data, and a large number of pieces of matching data may indicate a higher similarity between the training data and the wireless signal data.

In this case, the training data may be data determined in advance based on the type of wireless signal data, i.e., a physical address of a computer for transmitting data between computers, and may include key information (PCI, BAND, MAC, RSRP, RSSI information, etc.) of wireless signal data.

Figure 4:
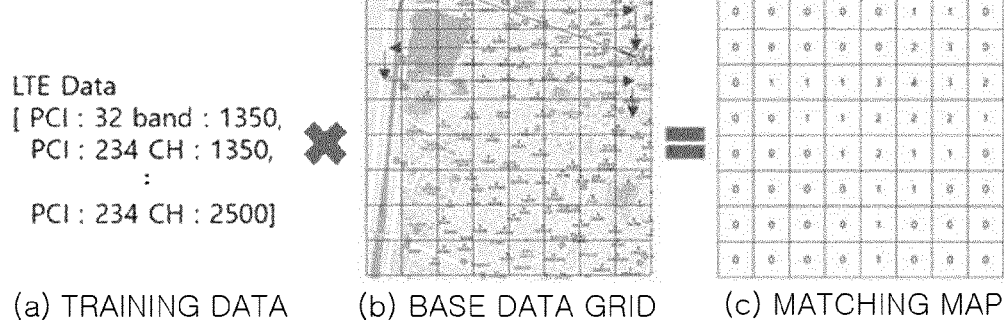
FIG. 4 illustrates a process of generating a matching map of Long-Term Evolution (LTE) data according to an embodiment of the present invention.

FIG. 4 illustrates a process of generating a matching map for each type of data according to an embodiment of the present invention.

For example, referring to FIG. 4, a matching map of LTE data may be generated by comparing a PCI and a channel (CH) of training data with a PCI and a channel (CH) of base data for each point of the grid to calculate the number of pieces of matching data, and inputting the calculated number to each point on the grid.

In this case, the training data may be training data prepared in advance, and may be composed as a matrix, and the base data grid may be subject to sequential calculations based on rows or columns.

In addition, for Wi-Fi data and BLE data, a matching map may be generated using MAC address information of data.

That is, a matching map may be generated by comparing the MAC address of the training data with the MAC address of each point of the base data grid and using the number of pieces of data having the same MAC address.

The terminal 200 for providing a positioning function may generate at least one matching map (an LTE data matching map, a Wi-Fi data matching map, a BLE data matching map, etc.) as described above.

According to an embodiment of the present invention, the terminal 200 for providing a positioning function may generate a matching map image based on the generated matching map (S207).

The terminal 200 may generate RGB values corresponding to matching values included in each of the plurality of matching maps, and generate a matching map image based on the generated RGB values.

The matching value may be the number of pieces of data matching the training data, which is allocated to the matching map.

For example, matching values included in a plurality of matching maps may each be matched with one of RGB values representing colors so that the matching values may be converted into an image.

When there are a total of three matching maps as in the above embodiment, the terminal 200 may substitute an LTE data matching value with an R value, a Wi-Fi data matching value with a G value, and a BLE data matching value with a B value.

On the other hand, when the matching count is directly substituted with an RGB value, the small matching count may result in lower color discrimination power. Therefore, the terminal 200 may apply a predetermined weight value w to each matching count, and substitute the matching count with an RGB value to generate a matching map image.

With such a configuration, the matching map images may be merged into one image having a plurality of colors at each of grid points 311 and 312 shown in FIG. 3.

Meanwhile, matching LTE data with an R value, Wi-Fi data with a G value, and BLE data with a B value is only an example, and it does not limit embodiments of the present invention.

Figure 5:
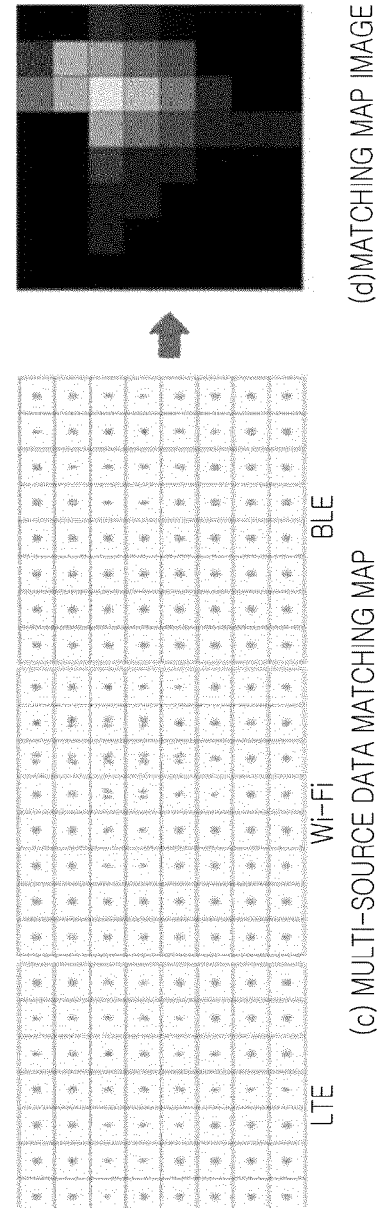
FIG. 5 illustrates an example of generating a matching map image according to an embodiment of the present invention.

FIG. 5 illustrates an example of generating a matching map image according to an embodiment of the present invention.

Referring to FIG. 5, as many matching map images as the number of pieces of training data collected for each point (e.g., 311 and 312 in FIG. 3) of the base data grid may be generated.

The terminal 200 may label data of the generated matching map image with a coordinate value of a grid point.

In this case, the coordinate value of the grid point may be coordinates of a point, among a plurality of points corresponding to the matching map image, at which any one of the R, G, and B values is the highest, or the sum of at least one value among the R, G, and B values is the highest. That is, the coordinate value of the grid point may be coordinates of a point at which the training data and the wireless signal data have the highest similarity according to each type of wireless signal data.

Accordingly, a plurality of matching map images for training may be generated for each labeling value in proportion to the number of times data collection is performed.

On the other hand, it is desirable to collect a sufficient amount of training data to generate an image classification model with high classification accuracy.

The terminal 200 for providing a positioning function may obtain a matching map image labeled as described above and generate an image classification model for precise positioning through deep learning. The image classification model generated as described above is a classification model for positioning.

Figure 6:
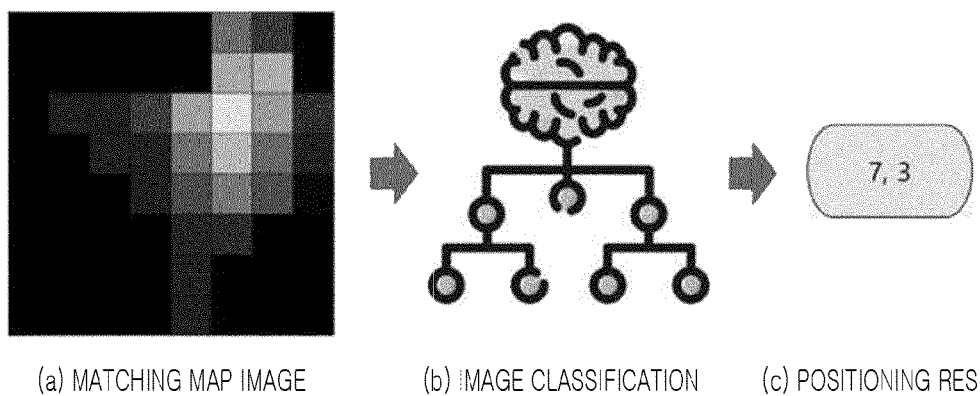
FIG. 6 illustrates an example of an image classification model input using a matching map image for positioning according to an embodiment of the present invention.

FIG. 6 illustrates an example of a classification model for positioning using a matching map image for positioning according to an embodiment of the present invention.

A classification model b for positioning according to an embodiment of the present invention may be an artificial neural network model having an input layer, an output layer, and at least one hidden layer, and outputting positioning information c when a matching map image is input thereto, and may be trained such that a defined loss function has a minimum value.

In this case, the positioning information c is a coordinate value of a grid point having the highest similarity between training data and wireless signal data of a corresponding point among a plurality of points included in a positioning target area.

Meanwhile, the terminal 200 for providing a positioning function according to the embodiment of the present invention may be implemented as a server as well as an electronic device, and may communicate with a terminal for positioning which desires to use a positioning function, and provide a positioning function in response to a positioning request signal from the terminal for positioning.

The corresponding embodiment will be described below with reference to FIG. 7.

Figure 7:
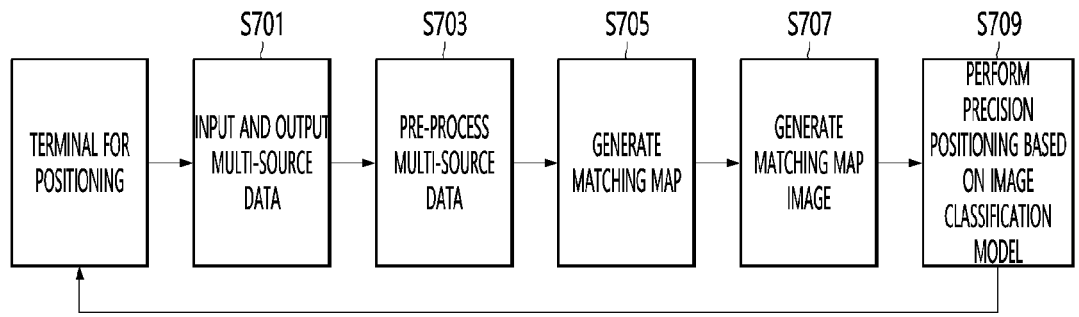
FIG. 7 illustrates a deep learning-based precise positioning process using a matching map image according to an embodiment of the present invention

FIG. 7 illustrates a deep learning-based precise positioning process using a matching map image according to an embodiment of the present invention.

Referring to FIG. 7, a terminal for positioning (not shown) may collect multi-source data of a single epoch to perform positioning.

The terminal 200 for providing a positioning function according to the embodiment of the present invention may, in response to a positioning request signal received from the terminal for positioning, generate a matching map image for positioning using the data received from the terminal for positioning, as described above (S701 to S707).

Thereafter, in response to the generated matching map image for positioning being input to a previously generated classification model for positioning, grid coordinates corresponding to a labeling value of the matching map image based on an output result of the classification model for positioning may be obtained.

The terminal 200 may convert the coordinates of the corresponding grid into latitude and longitude, thereby calculating a final positioning result (S709).

The terminal 200 may transmit the calculated positioning result back to the terminal for positioning (not shown), thereby completing a deep learning-based precise positioning process using a multi-source data matching map image.

As described above, the present invention uses a multi-source data matching map image that combines wireless signal data having various characteristics and reflects the topographical characteristics of the positioning area, such as a data collection route, to allow more precise positioning, and further applies a deep learning method based on an image classification model to the multi-source data matching map image, thereby reducing the effects of noise and the like, enabling stable and precise positioning.

In addition, the deep learning-based precise positioning method using the multi-source data matching map image described in the present invention may not require location information of a base station of a telecommunication company or a relay and thus may be independent of a telecommunication company, and may also reflect the topographical characteristics of the area in which positioning is performed, and thus obtain improved stability and positioning accuracy compared to the existing method.

Those skilled in the art should appreciate that the present invention may be embodied by various illustrative logical blocks, modules, processors, means, circuits, and algorithm steps described in connection with the embodiments disclosed herein that may be implemented as electronic hardware, various types of program or design code (for the sake of convenience, referred to as software here), or combinations thereof.

The present invention described above may be embodied as computer-readable code on a medium on which a program is recorded. The computer-readable recording medium is any data storage device that can store data that can thereafter be read by a computer system. Examples of the computer-readable recording medium may include a hard disk drive (HDD), a solid-state drive (SSD), a silicon disk drive (SDD), a read-only memory (ROM), a random-access memory (RAM), a compact disc read only memory (CD-ROM), a magnetic tape, a floppy disk, an optical data storage, and the like.

As is apparent from the above, the present invention is implemented to use a precision positioning method in which a matching map image capable of reflecting various types of multi-source wireless signal data and spatial characteristics of a region in which the data is collected is generated and deep learning is applied to the matching map image, thereby obviating a need for location information of a base station of telecommunication companies or a relay and reflecting topographical characteristics of a region which is subject to positioning, and thus obtaining improved stability and positioning accuracy compared to the existing method.

What is claimed is:

1. A positioning method comprising:
    obtaining, by a device for providing a positioning function, multi-source wireless signal data from a collection data database (DB);
    generating, by the device, a matching map using the multi-source wireless signal data;
    generating, by the device, a matching map image corresponding to the matching map;
    generating, by the device, a classification model for positioning that outputs a labeling value of the matching map image when the matching map image is input; and
    performing, by the device, positioning based on a labeling value of a classified image that is output as a result of inputting the matching map image to the classification model for positioning,
    wherein the generating, by the device, of the matching map using the multi-source wireless signal data includes:
        generating a grid including a plurality of points in a positioning target area;
        comparing a signal identifier of predetermined reference data with a signal identifier of the multi-source wireless signal data for each of the plurality of points to derive a number of pieces of data having the same signal identifier; and
        setting the derived number to each of the plurality of points in the grid to generate the matching map.

2. The positioning method of claim 1, wherein the generating, by the device, of the matching map using the multi-source wireless signal data includes:
    comparing a physical cell identifier (PCI) and a channel of predetermined reference data with a PCI and a channel of the multi-source wireless signal data for each of the plurality of points to derive a number of pieces of data having the same PCI and the same channel; and
    setting the derived number to the grid corresponding to the plurality of points to generate a matching map of Long-Term Evolution (LTE) data.

3. The positioning method of claim 1, wherein the generating, by the device, of the matching map using the multi-source wireless signal data includes:
    comparing a Media Access Control (MAC) address of predetermined reference data with a MAC address of the multi-source wireless signal data for each of the plurality of points to derive a number of pieces of data having the same MAC address; and
    setting the derived number to the grid corresponding to the plurality of points to generate a matching map using wireless-fidelity (Wi-Fi) data or Bluetooth Low Energy (BLE) data.

4. The positioning method of claim 1, wherein the generating, by the device, of the matching map image corresponding to the matching map includes:
    generating red-green-blue (RGB) values corresponding to matching values included in each of the matching maps; and
    generating a matching map image based on the generated RGB values.

5. The positioning method of claim 4, wherein the generating of the matching map image includes:
    setting a number of matches of LTE data to an R value, setting a number of matches of Wi-Fi data to a G value, and setting a number of matches of BLE data to a B value; and
    merging the R, G, and B values into one image to generate the matching map image.

6. The positioning method of claim 1, wherein the generating, by the device, of the classification model for positioning that outputs the labeling value of the matching map image when the matching map image is input includes,
    when the matching map image is input, labeling a coordinate value of a point among the plurality of points corresponding the matching map image at which the reference data and the wireless signal data have a highest similarity based on a type of the wireless signal data to generate the classification model for positioning.

7. The positioning method of claim 1, wherein the wireless signal data includes at least one of LTE data, Wi-Fi data, and BLE data.

8. A positioning device comprising:
    a communicator configured to receive a positioning request; and
    at least one processor,
    wherein the processor is configured to:
    obtain multi-source wireless signal data from a collection data database (DB);
    generate a matching map using the multi-source wireless signal data; and
    generate a matching map image corresponding to the matching map to generate a classification model for positioning that outputs a labeling value of the matching map image when the matching map image is input,
    wherein the processor is further configured to:
        generate a grid including a plurality of points in a positioning target area;
        compare a signal identifier of predetermined reference data with a signal identifier of the multi-source wireless signal data for each of the plurality of points to derive a number of pieces of data having the same signal identifier; and
        set the derived number to each of the plurality of points in the grid to generate the matching map.

9. The positioning device of claim 8, wherein the processor performs positioning based on a labeling value of a classified image that is output as a result of inputting the matching map image to the classification model for positioning.

10. The positioning device of claim 8, wherein the processor is configured to:
    compare a physical cell identifier (PCI) and a channel of predetermined reference data with a PCI and a channel of the multi-source wireless signal data for each of the plurality of points to derive a number of pieces of data having the same PCI and the same channel; and set the derived number to the grid corresponding to the plurality of points to generate a matching map of Long-Term Evolution (LTE) data.

11. The positioning device of claim 8, wherein the processor is configured to:
compare a Media Access Control (MAC) address of predetermined reference data with a MAC address of the multi-source wireless signal data for each of the plurality of points to derive a number of pieces of data having the same MAC address; and
set the derived number to the grid corresponding to the plurality of points to generate a matching map using wireless-fidelity (Wi-Fi) data or Bluetooth Low Energy (BLE) data.

12. The positioning device of claim 8, wherein the processor is configured to, in a case of generating a matching map image corresponding to the matching map, generate red-green-blue (RGB) values corresponding to matching values included in each of the matching maps, and generate a matching map image based on the generated RGB values.

13. The positioning device of claim 12, wherein the processor is configured to: in a case of generating the matching map image corresponding to the matching map,
set a number of matches of LTE data to an R value, set a number of matches of Wi-Fi data to a G value, and set a number of matches of BLE data to a B value; and
merge the R, G, and B values into one image to generate the matching map image.

14. The positioning device of claim 8, wherein the processor is configured to, in a case of generating the classification model for positioning that outputs the labeling value of the matching map image when the matching map image is input, when the matching map image is input, label a coordinate value of a point among the plurality of points corresponding the matching map image at which the reference data and the wireless signal data have a highest similarity based on a type of the wireless signal data to generate the classification model for positioning.

15. The positioning device of claim 8, wherein the wireless signal data includes at least one of LTE data, Wi-Fi data, and BLE data.

16. A system for providing a positioning function, the system comprising:
a terminal for positioning configured to transmit a signal for positioning to a device for providing a positioning function; and
a device for performing positioning in response to a positioning request signal being transmitted from the terminal for positioning,
wherein the device for performing positioning is configured to:
generate a matching map using multi-source wireless signal data;
generate a matching map image corresponding to the matching map; and
perform positioning using a classification model for positioning that outputs a labeling value of the matching map image when the matching map image is input,
wherein the device for performing positioning is further configured to:
generate a grid including a plurality of points in a positioning target area;
compare a signal identifier of predetermined reference data with a signal identifier of the multi-source wireless signal data for each of the plurality of points to derive a number of pieces of data having the same signal identifier; and
set the derived number to each of the plurality of points in the grid to generate the matching map.

* * * * *